US009696574B2

(12) United States Patent
Tanabe et al.

(10) Patent No.: US 9,696,574 B2
(45) Date of Patent: Jul. 4, 2017

(54) TRANSPARENT CONDUCTIVE LAMINATE AND TOUCH PANEL

(76) Inventors: Mari Tanabe, Ibaraki (JP); Hidehiko Andou, Ibaraki (JP); Hideo Sugawara, Ibaraki (JP)

( * ) Notice: Subject to any disclaimer, the term of this patent is extended or adjusted under 35 U.S.C. 154(b) by 0 days.

(21) Appl. No.: 14/116,044

(22) PCT Filed: May 1, 2012

(86) PCT No.: PCT/JP2012/061558
§ 371 (c)(1),
(2), (4) Date: Nov. 6, 2013

(87) PCT Pub. No.: WO2012/153677
PCT Pub. Date: Nov. 15, 2012

(65) Prior Publication Data
US 2014/0078422 A1    Mar. 20, 2014

(30) Foreign Application Priority Data

May 11, 2011  (JP) ................................. 2011-106535

(51) Int. Cl.
*G06F 3/041*     (2006.01)
*G02F 1/1333*    (2006.01)
(Continued)

(52) U.S. Cl.
CPC ............ *G02F 1/13338* (2013.01); *B32B 7/02* (2013.01); *B32B 7/12* (2013.01); *G06F 3/041* (2013.01);
(Continued)

(58) Field of Classification Search
None
See application file for complete search history.

(56) References Cited

U.S. PATENT DOCUMENTS

| 5,668,576 A | 9/1997 | Ikura et al. |
| 2006/0057371 A1* | 3/2006 | Kobayashi ............. C09J 7/0217 428/355 R |

(Continued)

FOREIGN PATENT DOCUMENTS

| CN | 101679819 A | 3/2010 |
| JP | 07-013695 A | 1/1995 |

(Continued)

OTHER PUBLICATIONS

Notification of Transmittal of Translation of International Preliminary Report on Patentability (Form PCT/IB/338) of International Application No. PCT/JP2012/061558 mailed Nov. 21, 2013 with Forms PCT/IB/373 and PCT/ISA/237.

(Continued)

*Primary Examiner* — Gerard Higgins
*Assistant Examiner* — Sathavaram I Reddy
(74) *Attorney, Agent, or Firm* — Westerman, Hattori, Daniels & Adrian, LLP

(57) ABSTRACT

A transparent conductive laminate includes a coating film including a first transparent resin film and a coating layer or layers provided on one or both sides of the first transparent resin film; a transparent conductive film including a second transparent resin film and a transparent conductive layer provided on one side of the second transparent resin film; and a pressure-sensitive adhesive layer interposed between the coating film and the transparent conductive film, wherein the coating layer of the coating film is laminated with the pressure-sensitive adhesive layer to a side of the transparent conductive film where the transparent conductive layer is not provided, the pressure-sensitive adhesive layer has a storage elastic modulus of 80,000 Pa or less at 120° C., and the adhesive strength between the pressure-sensitive adhe- (Continued)

sive layer and the coating layer is from 5 N/25 mm to 20 N/25 mm.

13 Claims, 1 Drawing Sheet

(51) Int. Cl.
  *B32B 7/02* (2006.01)
  *B32B 7/12* (2006.01)
(52) U.S. Cl.
  CPC ... *B32B 2307/202* (2013.01); *B32B 2457/202* (2013.01); *B32B 2457/208* (2013.01); *G06F 2203/04103* (2013.01); *Y10T 428/24355* (2015.01); *Y10T 428/31554* (2015.04); *Y10T 428/31565* (2015.04)

(56) References Cited

U.S. PATENT DOCUMENTS

| | | | |
|---|---|---|---|
| 2008/0176042 | A1 | 7/2008 | Nashiki et al. |
| 2009/0022967 | A1* | 1/2009 | Inenaga .................. B32B 7/12 428/214 |
| 2009/0029151 | A1 | 1/2009 | Noguchi et al. |
| 2010/0013784 | A1* | 1/2010 | Nashiki .................. C23C 14/08 345/173 |
| 2010/0143634 | A1 | 6/2010 | Yasui et al. |
| 2010/0209703 | A1 | 8/2010 | Takarada et al. |
| 2011/0135892 | A1 | 6/2011 | Nashiki et al. |
| 2011/0141059 | A1 | 6/2011 | Nashiki et al. |
| 2011/0143105 | A1 | 6/2011 | Nashiki et al. |
| 2011/0147340 | A1 | 6/2011 | Nashiki et al. |
| 2012/0094071 | A1 | 4/2012 | Itoh et al. |

FOREIGN PATENT DOCUMENTS

| | | |
|---|---|---|
| JP | 11-142619 A | 5/1999 |
| JP | 2002-103504 A | 4/2002 |
| JP | 2009-76432 A | 4/2009 |
| JP | 2009-242786 A | 10/2009 |
| JP | 4364938 B1 | 11/2009 |
| JP | 2010-140670 A | 6/2010 |
| JP | 2010-189545 A | 9/2010 |
| JP | 2012-128629 A | 7/2012 |
| TW | 201108261 A1 | 3/2011 |
| WO | 2007/099721 A1 | 9/2007 |
| WO | 2009/113537 A1 | 9/2009 |
| WO | 2012/081574 A1 | 6/2012 |

OTHER PUBLICATIONS

International Search Report dated Aug. 14, 2012, issued in corresponding application No. PCT/JP2012/061558.

Office Action dated Jan. 12, 2015, issued in corresponding Korean Patent Application No. 10-2013-7030583, with English translation (8 pages).

Office Action dated Jul. 27, 2015, issued in counterpart Korean application No. 2013-7030583 (w/English translation) (6 pages).

Office Action dated Apr. 20, 2015, issued in corresponding Taiwanese application No. 101116996 (w/English translation) (9 pages).

Office Action dated Apr. 1, 2015, issued in corresponding Chinese Patent Application No. 201280022847.9, w/English translation. (21 pages).

Office Action dated Mar. 17, 2015, issued in corresponding Japanese Patent Application No. 2011-106535, w/English translation. (6 pages).

Office Action dated Oct. 6, 2015, issued in counterpart Korean Patent Application No. 10-2013-7030583, with English translations. (8 pages).

* cited by examiner

TRANSPARENT CONDUCTIVE LAMINATE AND TOUCH PANEL

TECHNICAL FIELD

The present invention relates to a transparent conductive laminate including a coating film and a transparent conductive film, which are laminated together with a pressure-sensitive adhesive layer interposed therebetween. The transparent conductive laminate of the present invention can be used to form a transparent electrode for touch panels including display types such as liquid crystal displays and electroluminescent displays, and optical, ultrasonic, capacitance, and resistive touch panels, and other products. In particular, the transparent conductive laminate having a patterned transparent conductive layer is advantageously used to form an electrode substrate for an input device of a capacitance touch panel. Additionally, the transparent conductive film can be used for prevention of static buildup on transparent products or electromagnetic wave shielding of transparent products and to form liquid crystal dimming glass products, transparent heaters, and other products.

BACKGROUND ART

Conventionally, as transparent conductive films, those formed by laminating a transparent conductive layer (e.g. ITO film) on a transparent film base have been known. In this case, the transparent conductive film can be used to form an electrode substrate for a capacitance touch panel, the transparent conductive layer to be used is patterned (Patent Documents 1 and 2). Such a transparent conductive film, which has a patterned transparent conductive layer, is used in such a manner as to be laminated with other transparent conductive films and so on, and is suitably used in a multi-touch-type input device that can be operated with two or more fingers at the same time.

However, when the transparent conductive layer is patterned, level differences are generated in the transparent conductive layer due to patterning, so that a difference between a patterned part and a non-patterned part becomes evident, leading to deterioration of appearance. That is, when external light from the visibility surface side is reflected at the transparent conductive layer, or internal light from the display element side passes through the transparent conductive layer, presence/absence of patterning becomes evident, leading to deterioration of appearance.

The transparent conductive film, which includes a resin film substrate and a transparent conductive layer provided thereon, is also used to form a laminate. Such a laminate includes the resin film substrate, the transparent conductive layer provided thereon, a pressure-sensitive adhesive layer, and another transparent resin film substrate, wherein another transparent resin film substrate is laminated with the pressure-sensitive adhesive layer to a side of the resin film substrate where the transparent conductive layer is not provided. For example, the transparent conductive film is used to form a transparent electrode for a touch panel such as a resistive touch panel. In this case, the transparent conductive film and a coating film are laminated together with a pressure-sensitive adhesive layer interposed therebetween to form a transparent conductive laminate, which is used for appearance or visibility (Patent Documents 3 and 4). Unfortunately, a patterned transparent conductive layer used in a conventional transparent conductive laminate produced with the coating film is more visible than that in a transparent conductive film without coating film, and degrades the appearance.

PRIOR ART DOCUMENTS

Patent Documents

Patent Document 1: JP-A-2009-076432
Patent Document 2: JP-B1-4364938
Patent Document 3: JP-A-2002-103504
Patent Document 4: JP-A-07-013695

SUMMARY OF THE INVENTION

Problems to be Solved by the Invention

Deterioration of appearance due to the patterning is noticeable particularly when the transparent conductive film is heated for crystallizing the transparent conductive layer. This is considered to be because a large wave-like undulation occurs in the transparent conductive film due to heat treatment, so that level differences of the transparent conductive layer formed due to the patterning exceed a design value (for example, the level difference is equal to or more than 5 times the design value when the film base is a polyethylene terephthalate film). Such undulations are observed in a transparent conductive laminate rather than in a transparent conductive film. In particular, undulations significantly occur in a transparent conductive laminate in which a coating film has a coating layer placed on a pressure-sensitive adhesive layer.

It is an object of the present invention to provide a transparent conductive laminate including a coating film having a coating layer, a transparent conductive film having a transparent conductive layer, and a pressure-sensitive adhesive layer, in which the coating layer of the coating film is laminated with the pressure-sensitive adhesive layer to a side of the transparent conductive film where the transparent conductive layer is not provided, and in which even when the transparent conductive layer is patterned and crystallized by heat treatment, the level differences formed by patterning can be prevented from becoming larger than designed and from degrading the appearance.

Further, an object of the present invention is to provide a capacitive touch panel using the transparent conductive laminate.

Means for Solving the Problems

The present inventors have eagerly conducted studies for solving the aforementioned problems, and resultantly completed the present invention by inventing the transparent conductive laminate described below.

That is, the present invention relates to a transparent conductive laminate, including:

a coating film including a first transparent resin film and a coating layer or layers provided on one or both sides of the first transparent resin film;

a transparent conductive film including a second transparent resin film and a transparent conductive layer provided on one side of the second transparent resin film; and a pressure-sensitive adhesive layer interposed between the coating film and the transparent conductive film, wherein the coating layer of the coating film is laminated with the pressure-sensitive adhesive layer to a side of the transparent conductive film where the transparent conductive layer is not provided, the pressure-sensitive adhesive layer has a storage elastic modulus of 80,000 Pa or less at 120° C., and the adhesive strength between the pressure-sensitive adhesive layer and the coating layer is from 5 N/25 mm to 20 N/25 mm.

The transparent conductive laminate is preferably used even when the transparent conductive layer is patterned.

In the transparent conductive laminate, the transparent conductive layer is preferably placed on the second transparent resin film with at least one undercoat layer interposed therebetween.

In the transparent conductive laminate, the coating layer laminated to the pressure-sensitive adhesive layer preferably has a surface free energy of 25 mN/m to 40 mN/m after the coating film is heat-treated at 150° C. for 1 hour.

In the transparent conductive laminate, the coating layer laminated to the pressure-sensitive adhesive layer preferably has a surface with an arithmetic mean roughness (Ra) of 10 nm or less.

In the transparent conductive laminate, the coating layer laminated to the pressure-sensitive adhesive layer preferably has a surface with a root mean square roughness (Rq) of 12 nm or less.

The transparent conductive laminate is preferably used for in a touch panel. A touch panel in which the transparent conductive laminate is preferably used is a capacitance touch panel.

The present invention also rerates to a touch panel including at least one piece of the transparent conductive laminate.

A transparent conductive film having a patterned transparent conductive layer has different linear expansion coefficients in a patterned part and a non-patterned part of a transparent conductive layer. Further, it has been found that expansion and shrinkage behaviors are different in the patterned part and the non-patterned part of the transparent conductive film due to the difference in linear expansion coefficient when the transparent conductive film is heated for crystallizing the transparent conductive layer and then cooled. It is considered that such expansion and shrinkage behaviors occurring due to a difference in linear expansion coefficient develop a large wave-like undulation in the transparent conductive film itself, so that level differences of the transparent conductive layer formed by the patterning are noticeable, leading to deterioration of appearance. Thus, it is conceivable that in a transparent conductive film, the patterned part of a transparent resin film substrate on which a patterned transparent conductive layer remains is harder than the original transparent resin film substrate and is less likely to undergo heat shrinkage, but the non-patterned part of the transparent resin film substrate on which no transparent conductive layer remains is more likely to undergo heat shrinkage, so that such a difference can cause undulations to degrade the appearance.

When a transparent conductive film and another resin film substrate are laminated together with a pressure-sensitive adhesive layer interposed therebetween to form a transparent conductive laminate, undulations occurring on the transparent conductive film can be transferred to the pressure-sensitive adhesive layer and further transferred to the other resin film substrate through the pressure-sensitive adhesive layer. As a result, undulations may significantly increase in such a transparent conductive laminate. Particularly when the other resin film substrate is a coating film and when the coating layer of the coating film is placed on the pressure-sensitive adhesive layer, undulations may significantly increase.

The transparent conductive laminate of the present invention is designed in such a way that the transparent conductive film and the coating film are laminated together with a pressure-sensitive adhesive layer having a storage elastic modulus of 80,000 Pa or less at 120° C. and in such a way that the adhesive strength between the pressure-sensitive adhesive layer and the coating layer is from 5 to 20 N/25 mm. When a pressure-sensitive adhesive layer having a storage elastic modulus in the specified range is used, the pressure-sensitive adhesive layer can absorb wavelike undulations occurring on the transparent conductive film to prevent the propagation of the undulations, even when heat-treated, so that the level differences formed by patterning are prevented from becoming larger than designed. In addition, the pressure-sensitive adhesive layer is so controlled as to have a relatively weak adhesive strength in the specified range, so that even when undulations occurring on the transparent conductive film are transferred to the pressure-sensitive adhesive layer, the propagation of the undulations from the pressure-sensitive adhesive layer can be prevented, which would otherwise occur when a dislocation occurs between the pressure-sensitive adhesive layer and the coating film.

MODE FOR CARRYING OUT THE INVENTION

Figure 1:
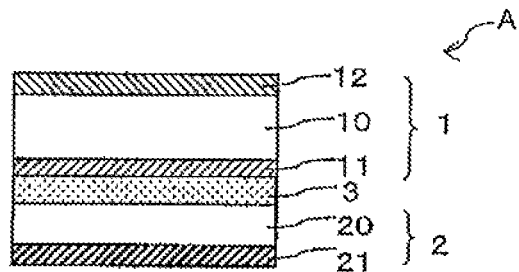
FIG. 1 is a cross-sectional view showing one embodiment of a transparent conductive laminate according to the present invention.
Figure 2:
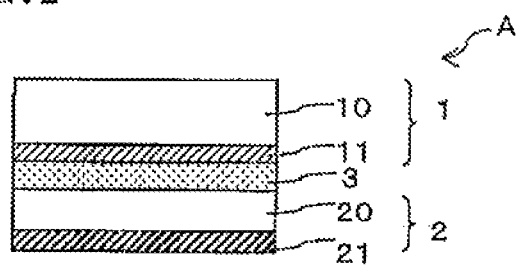
FIG. 2 is a cross-sectional view showing one embodiment of a transparent conductive laminate according to the present invention.
Figure 3:
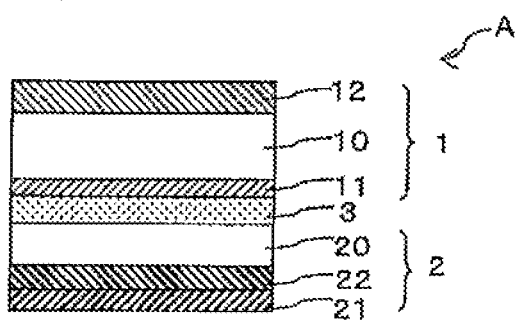
FIG. 3 is a cross-sectional view showing one embodiment of a transparent conductive laminate according to the present invention.
Figure 4:
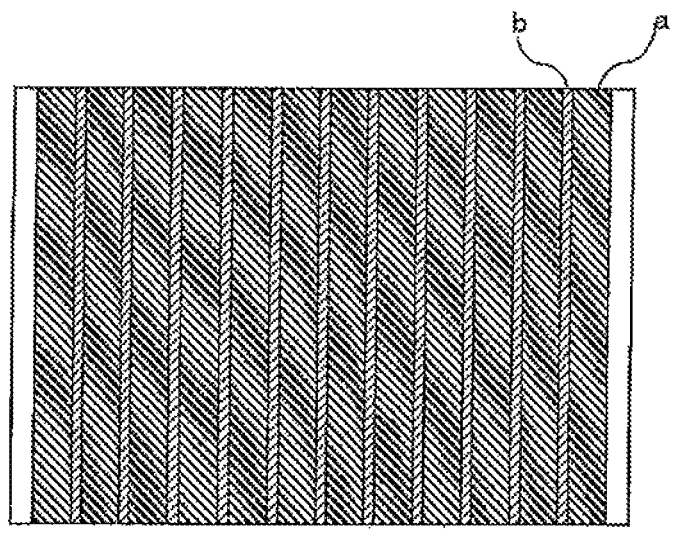
FIG. 4 is a top view showing one patterning of a transparent conductive laminate according to the present invention.

Embodiments of a transparent conductive laminate according to the present invention will be described below with reference to the drawings. FIGS. 1 to 3 are cross-sectional views each showing an embodiment of the transparent conductive laminate A of the present invention. In FIGS. 1 to 3, a coating film 1 and a transparent conductive film 2 are laminated together with a pressure-sensitive adhesive layer 3 interposed therebetween.

The coating film 1 includes a first transparent resin film 10 and a first coating layer 11 provided on one side of the film 10 or first and second coating layers 11 and 12 provided on both sides of the film 10. FIGS. 1 and 3 show cases where the first and second coating layers 11 and 12 are provided on both sides of the first transparent resin film 10, and FIG. 2 shows a case where only the first coating layer 11 is provided on one side of the first transparent resin film 10. The first and second coating layers 11 and 12 provided on both sides may be made of the same or different materials and may be the same or different in thickness or other property. The transparent conductive laminate A of the present invention has a pressure-sensitive adhesive layer 3 on the first coating layer 11.

The transparent conductive film 2 includes a second transparent resin film 20 and a transparent conductive layer 21 provided on one side of the film 20. FIGS. 1 and 2 show cases where the transparent conductive layer 21 is provided directly on the second transparent resin film 20. As shown in FIG. 3, the transparent conductive layer 21 may be provided on the film 20 with an undercoat layer 22 interposed therebetween. The undercoat layer 22 may be a single layer structure or a two or more layer structure. The coating film 1 is placed on one side of the transparent conductive film 2 where the transparent conductive layer 21 is absent, and a pressure-sensitive adhesive layer 3 is interposed between the coating film 1 and the transparent conductive film 2. Although not shown in FIGS. 1 to 3, the transparent conductive layer 21 used may be patterned as desired.

Examples of the first transparent resin film 10 used for the coating film 1 include, but are not limited to, a variety of plastic films having transparency. Examples of the material thereof include a polyester resin, an acetate resin, a polyether sulfone resin, a polycarbonate resin, a polyamide resin, a polyimide resin, a polyolefin resin, a (meth)acrylic resin, a polyvinyl chloride resin, a polyvinylidene chloride resin, a polystyrene resin, a polyvinyl alcohol resin, a polyarylate resin and a polyphenylene sulfide resin. Among them especially preferable are a polyester resin, a polycarbonate resin and a polyolefin resin.

Further, mention is made of a polymer film described in JP-A-2001-343529 (WO 01/37007), for example, a resin composition which contains (A) a thermoplastic resin having a substituted and/or unsubstituted imide group on a side chain and (B) a thermoplastic resin having a substituted and/or unsubstituted phenyl and a nitrile group on a side chain. Specifically, a polymer film of a resin composition containing an alternating copolymer composed of isobutylene and N-methylmaleimide, and an acrylonitrile/styrene copolymer can be used.

In general, to suppress undulations, the first transparent resin film 10 preferably has a thickness of 70 to 300 μm, more preferably 100 to 200 μm.

The coating layer is formed on one or both sides of the first transparent resin film. For the relationship between the first coating layer 11 and the pressure-sensitive adhesive layer 3, the first coating layer 11 is so selected that the pressure-sensitive adhesive layer 3 has an adhesive strength of 5 to 20 N/25 mm to the first coating layer 11.

In the transparent conductive laminate, the first coating layer preferably has a surface free energy of 25 mN/m to 40 mN/m after the coating film is heat-treated at 150° C. for 1 hour.

The first coating layer preferably has a surface with an arithmetic mean roughness (Ra) of 10 nm or less, more preferably 1 nm to 8 nm, even more preferably 3 nm to 6 nm. The first coating layer also preferably has a surface with a root mean square roughness (Rq) of 12 nm or less, more preferably 2 nm to 10 nm, even more preferably 4 nm to 8 nm.

The thickness of each of the first and second coating layers 11 and 12 may be determined as needed depending on the material used to form the coating layer, and for example, it is preferably from 15 nm to 10 μm. When the transparent conductive laminate is heated, oligomers should be prevented from precipitating from the first transparent resin film. From this point of view, the thickness of each of the first and second coating layers 11 and 12 is preferably from 20 nm to 1 μm. On the other hand, when the transparent conductive laminate is heated, curling should be suppressed, and the surface of the first transparent resin film should be protected. From this point of view, the thickness of each of the first and second coating layers 11 and 12 is preferably from 1 μm to 10 μm, more preferably from 2 μm to 10 μm. It will be understood that when the first and second coating layers 11 and 12 are provided on both sides of the first transparent resin film, they may have the same or different thicknesses and may be made of the same or different materials.

For example, the coating layer may be made using any of various materials for conventional hard coat layers, and examples of such materials include curable resins such as melamine resin, urethane resin, alkyd resin, acrylic resin, silicone resin, and acrylic urethane resins. Using any of these materials, the coating layer can be made as a cured resin layer.

For example, one of such curable resins may be a composition as disclosed in JP-A-2008-151998, which contains component (A): at least one of urethane acrylate and urethane methacrylate; component (B): at least one of polyol acrylate and polyol methacrylate; and component (C): a polymer or copolymer made from at least one of the following materials (C1): an alkyl acrylate having an alkyl group substituted with at least one of a hydroxyl group and an acryloyl group and (C2): an alkyl methacrylate having an alkyl group substituted with at least one of a hydroxyl group and an acryloyl group, or a blend of the polymer and the copolymer.

The coating layer may also be made using the material described below for the undercoat layer or using the material described below for the oligomer blocking layer. Alternatively, cured resin layer 1 or 2 described below may also be used as the coating layer.

A solvent and if necessary any of various common additives such as a leveling agent, an antistatic agent, a plasticizer, a surfactant, an antioxidant, and an ultraviolet absorber may be appropriately added to the material used to form the coating layer.

<Cured Resin Layer 1>

The material used to form the coating layer may be a resin composition containing at least two components that can cause phase separation from one another based on a difference in physical properties. When the composition is used to form cured resin layer 1, irregularities can be formed on the surface of cured resin layer 1.

(Resin Composition)

As a composition containing used to form the cured resin layer 1, a composition, for example described in International Publication WO 2005/073763, containing at least two components that undergo phase separation based on a difference in physical properties can be suitably used. The resin composition is a composition that, when the resin composition is applied to the substrate, a resin layer having random irregularities on the surface can be formed with first and second components in the resin composition undergoing phase separation based on a difference of their physical properties. Specifically, the first and second components contained in this resin composition can be independently selected from the group consisting of monomers, oligomers, and polymers.

Examples of the first and second components include monomers such as polyfunctional monomers and resins having a (meth)acrylic resin, an olefin resin, a polyether resin, a polyester resin, a polyurethane resin, a polysiloxane resin, a polysilane resin, a polyimide resin, or a fluororesin in the skeletal structure. These resins may be a so-called oligomer that has a low molecular weight. An example of the polyfunctional monomer may be a dealcoholization reactant of a polyhydric alcohol and (meth)acrylate. Specifically, dipentaerythritolhexa(meth)acrylate, trimethylolpropanetri(meth)acrylate, and the like can be used.

The oligomers and polymers may be a copolymer consisting of two or more of the above-described skeletal structures or may be a copolymer consisting of the above-described skeletal structures and monomers other than the structures.

The first and second components of the resin composition may be an oligomer or a polymer containing same kind of skeletal structures or may be an oligomer or a polymer containing different skeletal structures. Either one of the first and second components may be a monomer and the other one may be an oligomer or a polymer.

The respective first and second components of the resin compositions preferably have functional groups that react with each other. The hardness of the cured resin layer can be increased by making such functional groups react with each other. Examples of the combination of such functional groups include a combination of a functional group having active hydrogen (a hydroxyl group, an amino group, a thiol group, or a carboxyl group) with an epoxy group, a combination of a functional group having active hydrogen with an isocyanate group, a combination of an ethylenically unsaturated group with an ethylenically unsaturated group, a combination of a silanol group with a silanol group, a combination of a silanol group with an epoxy group, a combination of a functional group having active hydrogen with a functional group having active hydrogen, a combination of active methylene with an acryloyl group, and a combination of an oxazoline group with a carboxyl group.

Herein, the "functional groups that react with each other" includes functional groups that react with each other by mixing a catalyst or a curing agent together although the reaction does not proceed when only the first and second components are mixed together. Examples of the usable catalyst include a photoinitiator, a radical initiator, an acid-base catalyst, and a metal catalyst. Examples of the usable curing agent include a melamine curing agent, a (block) isocyanate curing agent, and an epoxy curing agent.

When the respective first and second components of the resin compositions have functional groups that react with each other, the mixture of the first and second components has curing properties such as heat curing properties and photocuring properties including an ultraviolet curing property, a visible light curing property, and an infrared curing property.

In the present invention, the first and second components are preferably a resin containing a (meth)acrylic resin in the skeletal structure. The molecular weight (weight average molecular weight when the first and second components are resins) of the first and second components is preferably 100 to 100,000.

Examples of the physical property difference in the first and second components that can cause phase separation of the first and second components when the difference reaches a certain level include the SP value, the glass transition temperature (Tg), the surface tension, and the number average molecular weight.

The SP value is an abbreviation of a solubility parameter, and it is a scale of the solubility. The polarity is higher as the SP value is larger, and the polarity is lower as the SP value is smaller. The SP value can be measured by a method described in Suh, Clarke, J. P. S. A-1, 5, 1671-1681 (1967).

When a difference in physical properties of each of the first and second components that causes phase separation of the first and second components is a difference in the SP value, the difference in the SP value between the first component and the second component is preferably 0.5 or more and more preferably 0.8 or more. The upper limit of the difference in the SP value is not especially limited. However, it is generally 15 or less. When the difference in the SP value between the first component and the second component is 0.5 or more, the mutual solubility of each resin is low, and thereby, the phase separation of the first and second components is considered to occur after applying the coating composition.

As described later, the resin composition is applied onto a substrate as a coating composition containing an organic solvent and fine particles to form the cured resin layer. For the first and second components and the organic solvent contained in the coating composition, the SP value ($SP_1$) of the first component, the SP value ($SP_2$) of the second component, and the SP value ($SP_{sol}$) of the organic solvent preferably satisfy the following condition;

$SP_1 < SP_2$, and the difference between $SP_1$ and $SP_{sol}$ is 2 or less.

When the difference between $SP_1$ and $SP_{sol}$ is 2 or less, a cured resin layer can be prepared that has low haze and excellent irregularities forming properties by the phase separation. The difference between $SP_1$ and $SP_{sol}$ is more preferably 1 or less, that is, in a range of 0 to 1. It is acceptable that the difference between $SP_1$ and $SP_{sol}$ is 2 or less. $SP_1$ and $SP_{sol}$ may satisfy $SP_1 < SP_{sol}$ or $SP_1 > SP_{sol}$.

The ratio between the first and second components in the resin composition is appropriately set so that phase separation occurs in both components. However, it is preferably, in weight ratio, 1:99 to 99:1, and more preferably 1:99 to 50:50, and further preferably 1:99 to 20:80. The resin composition may contain resins that are normally used besides the first and second components.

When the resin composition is used as the material for forming the coating layer, the resin composition preferably contains fine particles.

(Fine Particles)

Fine particles having transparency such as fine particles of various metal oxides, glass, plastics, and the like can be used as the fine particles contained in the cured resin layer without any special limitation. Examples thereof include inorganic fine particles of silica, alumina, titania, zirconia, calcium oxide, etc., crosslinked or non-crosslinked organic fine particles made of various polymers such as polymethylmethacrylate, polystyrene, polyurethane, an acrylic resin, an acrylic styrene copolymer, benzoguanamine, melamine, and polycarbonate, and silicone fine particles. One kind or two or more kinds of the fine particles can be appropriately selected and used. However, organic fine particles are preferable. From the viewpoint of a refractive index, an acrylic resin is preferable as the organic fine particles.

The fine particles in cured resin layer 1 preferably have an average particle size equal to 25% to 80%, more preferably 30% to 70%, even more preferably 35% to 65% of the thickness of cured resin layer 1. If the fine particles have an average particle size more than 80% of the thickness of cured resin layer 1, they may increase haze and reduce transparency, or they may tend to cause an appearance defect such as a streak during the formation of cured resin layer 1. On the other hand, if the fine particles have an average particle size less than 25% of the thickness of cured resin layer 1, irregularities formed on the surface may be insufficient.

To suppress an increase in haze, the fine particles preferably have an average particle size of 2,400 nm, more preferably 2,000 nm or less, even more preferably 1,000 nm or less. The fine particles preferably have an average particle size of 250 nm or more, more preferably 500 nm or more, even more preferably 700 nm or more.

The content of the fine particles in cured resin layer 1 is preferably from 0.01 to 5 parts by weight, more preferably from 0.05 to 2 parts by weight, even more preferably from 0.1 to 1 part by weight, based on 100 parts by weight of the solid of the resin composition. If the content of the fine particles in cured resin layer 1 is low, it can tend to be difficult to form sufficient irregularities on the surface of cured resin layer 1. If the content of the fine particles is too high, light scattering caused by the fine particles will tend to increase the haze of the transparent conductive film and to reduce the visibility of the transparent conductive film. If the content of the fine particles is too high, streaks may occur in the process of forming cured resin layer 1 (in the process of applying a solution), so that visibility may decrease.

As described above, the fine particles in cured resin layer 1 have particle sizes smaller than the thickness of cured resin layer 1, and the content of the fine particles is relatively low. Therefore, in general, it is unlikely that surface irregularities enough to impart anti-blocking properties or lubricity are formed only by such particles. Although it is not clear why the surface irregularities are formed when such a small amount of fine particles are added in the present invention, it is conceivable that the fine particles can trigger the phase separation of the resin composition, so that the phase separation can be accelerated to facilitate the formation of large irregularities.

(Coating Composition)

The coating composition used to form the cured resin layer 1 contains the above-described resin compositions and a solvent. Described above, the coating composition may contain fine particles. Various additives can be added into the coating composition as necessary. Examples of such additives include conventional additives such as an antistatic agent, a plasticizer, a surfactant, an antioxidant, and an ultraviolet absorbent.

The coating composition is prepared by mixing the first and second components and other resins, with the above-described fine particles, a solvent, additives, catalysts, and the like as necessary. The solvent in the coating composition is not especially limited, and appropriately selected considering the first and second components, the material of the portion that serves as a base of coating, an application method of the composition, and the like. Specific examples of the solvent include an aromatic solvents such as toluene and xylene; ketone solvents such as methyl ethyl ketone, acetone, methyl isobutyl ketone, and cyclohexanone; ether solvents such as diethyl ether, isopropyl ether, tetrahydrofuran; ester solvents such as ethyl acetate, and butyl acetate; amide solvents such as dimethylformamide, diethylformamide, and N-methylpyrrolidone; cellosolve solvents such as methylcellosolve, ethylcellosolve, and butylcellosolve; alcohol solvents such as methanol, ethanol, and propanol; and halogen solvents such as dichloromethane and chloroform. These solvents may be used alone or two or more may be used together. Among these solvents, an ester solvent, an ether solvent, an alcohol solvent, and a ketone solvent can be preferably used.

When the difference in physical properties that causes phase separation of the first and second components is the difference in the SP value, examples of the solvent include ketone solvents such as methyl ethyl ketone, acetone, methyl isobutyl ketone, and cyclohexanone; alcohol solvents such as methanol, ethanol, propanol, isopropanol, and butanol; and ether solvents such as anisole, phenetolepropylene glycol monomethy ether, ethylene glycol dimethyl ether, ethylene glycol diethyl ether, diethylene glycol dimethyl ether, and diethylene glycol diethyl ether from the viewpoint of setting the difference between $SP_1$ and $SP_{sol}$ to 2 or less as described above. One of these solvents may be used alone or two or more of the organic solvents may be mixed and used. When two or more of the organic solvents are used, at least one of the organic solvents used may bring a difference between $SP_1$ and $SP_{sol}$ of 2 or less.

The fine particles in the coating composition are preferably dispersed in the solution. Various known methods can be adopted as a method for dispersing the fine particles in the solution such as a method for mixing by adding the fine particles to the resin composition solution and a method for adding the fine particles dispersed in the solvent in advance to the resin composition solution.

(Coating and Curing)

The cured resin layer is formed by applying the above-described coating composition onto the base material. The method for applying the coating composition can be appropriately selected according to the coating composition and the state of the coating step. Examples of the method include a dip coating method, an air knife coating method, a curtain coating method, a roller coating method, a wire bar coating method, a gravure coating method, and an extrusion coating method.

The coating film applied to the base material may be cured as it is or may be dried before curing to undergo the phase separation in advance. When the coating film is dried before curing, it is dried at 30 to 200° C., more preferably 40 to 150° C. for 0.1 to 60 minutes, more preferably 1 to 30 minutes to remove the solvent and have the components in the coating film undergo the phase separation. When the mixture of the first and second components is photocurable, phase separation by drying before curing has an advantage that the solvent in the cured resin layer 1 can be effectively removed and the irregularities can be easily formed on the surface.

As another method for causing the phase separation before curing, it is possible to use a method for causing the phase separation by irradiating light to the coating film. As light to be irradiated, for example, light having an exposure amount of 0.1 to 1.5 J/cm$^2$, and preferably 0.5 to 1.5 J/cm$^2$, can be used. Although a wavelength of irradiation light is not particularly limited, irradiation light having a wavelength of 360 nm or less can be adopted, for example. There is an advantage that phase separation is performed by irradiating light, making it possible to avoid a variation in a surface profile due to a drying variation of solvents contained in the coating composition.

After applying the coating composition, the cured resin layer 1 is formed by curing the dried coating film as necessary. If a mixture of the first and second components is heat curable, the mixture can be cured by heating at 40 to 280° C., and preferably at 80 to 250° C., for 0.1 to 180 minutes, and preferably for 1 to 60 minutes. If a mixture of the first and second components is photo-curable, the mixture can be cured by irradiating light using a light source emitting light having a necessary wavelength. Light irradiation can be used for phase separation as described above.

<Cured Resin Layer 2>

The cured resin layer 2 is a cured layer formed by curing a composition containing a curable compound and inorganic oxide particles. The cured resin layer 2 has functions such as preventing migration of migrant components in the first transparent resin film 10, typically, migration of low-molecular-weight polyester oligomer components, which are migrant components in a polyester film.

The cured resin layer 2 preferably has a thickness of 120 nm or more. The thickness of the cured resin layer 2 is preferably 150 nm or more, more preferably 300 nm. In general, coating film 1 should be prevented from curling or reduced in cost. Form this point of view, the thickness of cured resin layer 2 is preferably, but not limited to, 1 μm or less, more preferably 500 nm or less.

The curable compound may be a material that has a functional group containing at least one polymerizable double bond in the molecule and is capable of forming a resin layer. The polymerizable double bond-containing functional group may be a vinyl group, a (meth)acryloyl group, or the like. The term "(meth)acryloyl group" means an acryloyl group and/or a methacryloyl group, and "(meth)", as used herein, has the same meaning.

The curable compound may be a curable resin having the polymerizable double bond-containing functional group. Examples of such a resin include a silicone resin, a polyester resin, a polyether resin, an epoxy resin, a urethane resin, an alkyd resin, a spiroacetal resin, a polybutadiene resin, a polythiolpolyene resin, an oligomer or prepolymer of an acrylate or methacrylate of a polyfunctional compound such as a polyhydric alcohol. These compounds may be used alone or in combination of two or more.

Besides the above active energy ray-curable resin, the curable compound may be a reactive diluent having a functional group containing at least one polymerizable double bond in the molecule. Examples of the reactive diluent include monofunctional (meth)acrylates such as hydroxyethyl(meth)acrylate, hydroxypropyl(meth)acrylate, hydroxybutyl(meth)acrylate. Examples of the reactive diluent also include bifunctional, trifunctional, and polyfunctional (meth)acrylates such as diethylene glycol di(meth)acrylate, triethylene glycol di(meth)acrylate, dipropylene glycol di(meth)acrylate. Other examples include butanediol glycerine ether di(meth)acrylate and (meth)acrylate of isocyanuric acid. The reactive diluents may be used alone or in combination of two or more.

The composition used to form the cured resin layer 2 also contains inorganic oxide particles in addition to the curable compound. Examples of the inorganic oxide particles include fine particles of silicon oxide (silica), titanium oxide, aluminum oxide, zinc oxide, tin oxide, zirconium oxide, mica, etc. Particularly preferred are fine particles of silicon oxide (silica), titanium oxide, aluminum oxide, zinc oxide, tin oxide, and zirconium oxide. These may be used alone or in combination of two or more.

The inorganic oxide particles are preferably nanoparticles with a weight average particle size in the range of 1 nm to 200 nm. The weight average particle size is more preferably in the range of 1 nm to 100 nm. The weight average particle size of the inorganic oxide particles is that of fine particles determined by Coulter counting method. More specifically, a particle size distribution meter (Coulter Multisizer (trade name) manufactured by Beckman Coulter, Inc.) based on pore electric resistance method is used to measure the electric resistance of an electrolytic solution, which corresponds to the volume of fine particles passing through pores, so that the number and volume of the fine particles are determined, and the weight average particle size is calculated from the number and volume of the fine particles.

The inorganic oxide particles used may be bonded to an organic compound containing a polymerizable unsaturated group. The polymerizable unsaturated group is cured by reacting with the curable compound to increase the hardness of the oligomer blocking layer. For example, the polymerizable unsaturated group is preferably an acryloyl group, a methacryloyl group, a vinyl group, a propenyl group, a butadienyl group, a styryl group, an ethynyl group, a cinnamoyl group, a maleate group, or an acrylamide group. The polymerizable unsaturated group-containing organic compound is preferably a compound having a silanol group in the molecule or a compound capable of undergoing hydrolysis to produce a silanol group. The polymerizable unsaturated group-containing organic compound also preferably has a photosensitive group.

The refractive index of the oligomer cured resin layer 2 is controlled by the addition of the inorganic oxide particles to the curable compound. The refractive index of the cured resin layer 2 is controlled to have a difference of 0.04 or less from the refractive index of the pressure-sensitive adhesive layer 13. The control of the refractive index difference successfully suppresses interference fringes caused by the cured resin layer 2. The refractive index difference is preferably 0.03 or less, more preferably 0.02 or less.

The content of the inorganic oxide particles is such that the refractive index difference is 0.04 or less when the organic oxide particles are used in combination with the curable compound as described above. The refractive index of the pressure-sensitive adhesive layer 13 is generally from 1.46 to 1.49 (for example, an acrylic pressure-sensitive adhesive layer has a refractive index of about 1.47). Taking into account the refractive indices of the curable compound and the inorganic oxide particles, the content of the organic oxide particles is so determined that the difference between the refractive indices of the cured resin layer 2 and the pressure-sensitive adhesive layer 13 can be 0.04 or less. From these points of view, the content of the inorganic oxide particles (for example, with a refractive index of 1.43 to 1.47) may be in the range of 50 to 300 parts by weight, preferably in the range of 100 to 200 parts by weight, more preferably in the range of 100 to 150 parts by weight, based on 100 parts by weight of the curable compound (for example, with a refractive index of 1.51 to 1.55). Such a content is also preferred in order to impart hardness to the cured resin layer 2 so that curling can be suppressed or in order to impart scratch resistance to the cured resin layer 2.

Besides the curable compound and the inorganic oxide particles, the composition used to form the cured resin layer 2 may also contain second particles with an average particle size of 300 nm to 2 μm other than the inorganic oxide particles. When the second particles are added to the cured resin layer 2, the cured resin layer 2 can have anti-blocking properties. For example, when the cured resin layer 2 contains the second particles, a long coating film 1 can be wound into a roll without using any protective film. If the second particles have an average particle size of less than 300 nm, anti-blocking properties may be insufficient. On the other hand, if the average particle size is more than 2 μm, haze may undesirably increase. The average particle size of the second particles is preferably from 400 to 1,500 nm, more preferably from 500 to 1,000 nm. The average particle size of the second particles is the value determined by laser method.

The content of the second particles is preferably from 0.01 to 10 parts by weight based on 100 parts by weight of the curable compound. If the content of the second particles is less than 0.1 parts by weight, anti-blocking properties may be insufficient. On the other hand, if the content is more than 10 parts by weight, haze may undesirably increase. The content of the second particles is preferably from 0.03 to 5 parts by weight, more preferably from 0.05 to 1 part by weight.

Examples of the second particles include, but are not limited to, crosslinked or non-crosslinked organic particles of various polymers such as poly(methyl methacrylate), polyurethane, polystyrene, acryl-styrene copolymers, and melamine resin; and inorganic particles of glass, silica, alumina, calcium oxide, titania, zirconia, and zinc oxide. The second particles used are other than the inorganic oxide particles. The second particles can be differentiated in average particle size from the inorganic oxide particles, and materials for the second particles may include inorganic oxides. Since any refractive index difference influences the haze, organic particles are preferably used as the second particles. In addition, the second particles used preferably have a refractive index difference of 0.1 or less from the average of the refractive indices of the curable compound and the inorganic oxide particles. When the refractive index difference is 0.1 or less, the increase in haze caused by the addition of the second particles can be kept small. The refractive index difference is more preferably 0.05 or less, even more preferably 0.03 or less. The average of the refractive indices of the curable compound and the inorganic oxide particles corresponds to the refractive index of the cured resin layer 2 produced with these materials.

The cured resin layer 2 is formed as a cured layer, which is produced by curing the composition containing the curable compound and the inorganic oxide particles. The cured layer can be formed by curing with active energy rays or by thermosetting. A polymerization initiator may be added to the composition, depending on the curing method. When electron beams are used as the active energy rays, the polymerization initiator is not particularly necessary. When ultraviolet rays are used as the active energy rays, a photopolymerization initiator should be used. When a thermosetting pressure-sensitive adhesive composition is used, a thermally-cleavable polymerization initiator should be used. The cured layer is preferably formed using ultraviolet rays as the active energy rays.

Examples of the conventionally known photopolymerization initiator include benzophenone compounds, aromatic ketone compounds, acetophenone compounds, benzoin ether compounds, aromatic ketal compounds, aromatic sulfonyl chloride compounds, optically active oxime compounds, thioxanthone compounds.

The amount of the photopolymerization initiator is preferably, but not limited to, 0.1 to 10 parts by weight based on 100 parts by weight of the active energy ray-curable compound. The amount of the photopolymerization initiator is preferably 1 part by weight or more, more preferably 2 parts by weight or more. On the other hand, the amount of the photopolymerization initiator is preferably 8 parts by weight or less, more preferably 5 parts by weight or less.

The composition may also be diluted with an appropriate solvent to form a solution of the composition. The solution containing the composition and the solvent is applied to the first transparent resin film 10 to form a coating layer, and then the coating layer is cured after the solvent is removed by drying.

A solvent capable of dissolving the curable compound and so on are selected and used to form the solution of the composition. Examples of solvents that may be used include various solvents such as ether solvents such as dibutyl ether, dimethoxymethane and dimethoxyethane; ketone solvents such as acetone, methyl ethyl ketone and methyl isobutyl ketone; ester solvents such as ethyl acetate, butyl acetate and ethyl propionate; acetylacetone solvents such as acetylacetone, diacetone alcohol and methyl acetoacetate; alcohol solvents such as methanol, ethanol and propanol; and glycol ether solvents such as ethylene glycol monoethyl ether acetate, ethylene glycol monoethyl ether and ethylene glycol monobutyl ether. These solvents may be used alone or in combination of two or more. The concentration of the solution of the composition is generally from 1 to 60% by weight, preferably from 2 to 10% by weight.

The solution of the composition may be applied by a coating method such as roll coating such as reverse coating or gravure coating, spin coating, screen coating, fountain coating, dipping, or spraying. The coating layer is formed so that an cured resin layer 2 with a thickness of 120 nm or more can be finally obtained.

Subsequently, the solvent in the coating layer is removed by drying, and then the coating layer is cured. Curing means may be selected from thermosetting or curing with active energy rays. In general, ultraviolet irradiation is preferably performed as the curing means. Ultraviolet irradiation can be performed using a high-pressure mercury lamp, a low-pressure mercury lamp, a halogen lamp, a xenon lamp, a metal halide lamp, or the like. Ultraviolet irradiation is preferably performed at an ultraviolet wavelength of 365 nm and a total dose of 50 to 500 mJ/cm$^2$. When the dose is 50 mJ/cm$^2$ or more, curing can be performed more sufficiently, so that the resulting cured resin layer 2 can have a more sufficient level of hardness. When the dose is 500 mJ/cm$^2$ or less, discoloration of the resulting cured resin layer 2 can be prevented.

As needed, a functional layer may be provided to a side of the first transparent resin transparent film 10 of the coating film 1 where the pressure-sensitive adhesive layer 3 was not laminated. For the purpose of improving visibility, an antiglare layer or an anti-reflection layer may be provided as the functional layer. The functional layer may be provided together with the second coating layer 12. The material used to form the anti-glare layer is typically, but not limited to, ionizing radiation-curable resin, thermosetting resin, thermoplastic resin, or the like. The anti-glare layer preferably has a thickness of 0.1 to 30 µm. The anti-reflection layer may be formed using titanium oxide, zirconium oxide, silicon oxide, magnesium fluoride, or the like. A plurality of anti-reflection layers may be provided.

Examples of the second transparent resin film 20 for the transparent conductive film 2 include the same resin films as listed above for the first transparent resin film 10. The second transparent resin film 20 may be made of the same material as the first transparent resin film 10. In general, the second transparent resin film 20 preferably has a thickness of 2 to 200 µm, more preferably 2 to 100 µm. If the second transparent resin film 20 has a thickness of less than 2 µm, the second transparent resin film 20 may have insufficient mechanical strength, which may make difficult the process of continuously forming the undercoat layer or the transparent conductive layer using a roll of the second transparent resin film 20. On the other hand, if its thickness is more than 200 µm, there may be some cases where the scratch resistance of the transparent conductive layer 21 or its tapping durability for a touch panel cannot be improved.

The transparent conductive layer 21 is provided directly on one side of the second transparent resin film 20 where the pressure-sensitive adhesive layer 3 is not placed, or the transparent conductive layer 21 is provided on one side of the second transparent resin film 20 with an undercoat layer 22 interposed therebetween, wherein the pressure-sensitive adhesive layer 3 is not placed on the side of the second transparent resin film 20 where the transparent conductive layer 21 is provided.

The surface of the second transparent resin film 20 may be subjected beforehand to an etching treatment or undercoating treatment such as sputtering, corona discharge, flame treatment, ultraviolet ray irradiation, electron beam irradiation, chemical formation or oxidization. Thereby, adhesion to the second transparent resin film 20 of the transparent conductive layer 21 or the undercoat layer 22 provided thereon can be improved. The film base may be freed from dust and cleaned by solvent cleaning or ultrasonic cleaning as necessary before the transparent conductive layer 21 or the undercoat layer 22 is provided.

The constituent material of the transparent conductive layer 21 is not particularly limited, and a metal oxide of at least one metal selected from the group consisting of indium, tin, zinc, gallium, antimony, titanium, silicon, zirconium, magnesium, aluminum, gold, silver, copper, palladium and tungsten is used. The metal oxide may further contain metal atoms shown in the above-mentioned group as necessary. For example, indium oxide containing tin oxide, tin oxide containing antimony, and the like are preferably used.

The thickness of the transparent conductive layer 21 is not particularly limited, but is preferably 10 nm or more, more preferably 15 to 40 nm, further preferably 20 to 30 nm. If the thickness of the transparent conductive layer 21 is 15 nm or more, it is easy to have a satisfactory surface resistance of $1\times10^3$ $\Omega/\square$ or less. Further, it is easy to form a continuous film. If the thickness of the transparent conductive layer 21 is 40 nm or less, a layer having higher transparency can be formed.

The method for forming the transparent conductive layer 21 is not particularly limited, and a conventionally known method can be employed. Specific examples thereof include a vacuum deposition method, a sputtering method and an ion plating method. An appropriate method can also be employed according to a required thickness.

A difference in refractive index between the transparent conductive layer 21 and the undercoat layer 22 described later is preferably 0.1 or more. The refractive index of the transparent conductive layer 21 is normally about 1.95 to 2.05.

The undercoat layer 22 can be formed from an inorganic substance, an organic substance or a mixture of an inorganic substance and an organic substance. Examples of the inorganic substance include inorganic substances such as NaF (1.3), $Na_3AlF_6$ (1.35), LiF (1.36), $MgF_2$ (1.38), $CaF_2$ (1.4), $BaF_2$ (1.3), $SiO_2$ (1.46), $LaF_3$ (1.55), $CeF_3$ (1.63) and $Al_2O_3$ (1.63) [the numerical value within the parenthesis for the above-mentioned each material is a refractive index]. Among them, $SiO_2$, $MgF_2$, $Al_2O_3$ and the like are preferably used. In particular, $SiO_2$ is suitable. Besides the inorganic substances described above, a composite oxide containing about 10 to 40 parts by weight of cerium oxide and about 0 to 20 parts by weight of tin oxide with respect to 100 parts by weight indium oxide can be used.

Examples of the organic substance include an acryl resin, a urethane resin, a melamine resin, an alkyd resin, a siloxane polymer and an organic silane condensate. At least one of these organic substances is used. As the organic substance, in particular, it is desirable to use a thermosetting resin formed of a mixture of a melamine resin, an alkyd resin and an organic silane condensate.

After the transparent conductive layer 21 is formed, if necessary, the transparent conductive layer 21 may be crystallized by annealing in the range of 100 to 150° C. For this purpose, the first and second transparent resin films 10 and 20 preferably have a heat resistance of 100° C. or higher, more preferably 150° C. or higher. In the present invention, the transparent conductive layer 21 may be patterned by etching. After crystallized, the transparent conductive layer 21 may be difficult to etch. Thus, annealing the transparent conductive layer 21 is preferably performed after patterning the transparent conductive layer 21. When the undercoat layer 22 is further etched, annealing the transparent conductive layer 21 is preferably performed after etching the undercoat layer 22.

The pressure-sensitive adhesive layer 3 is used to laminate the first coating layer 11 of the coating film 1 to the side of the transparent conductive film 2 where the transparent conductive layer 21 is absent. The pressure-sensitive adhesive layer 3 has a storage elastic modulus of 80,000 Pa or less at 120° C., and the adhesive strength of the pressure-sensitive adhesive layer 3 is adjusted to 5 to 20 N/25 mm with respect to the first coating layer 11. The use of the pressure-sensitive adhesive layer 3 having such a storage elastic modulus makes it possible to absorb undulations, so that undulations occurring on the transparent conductive film 1 can be prevented from propagating to the coating film 1.

To maintain the uniformity of the surface shape of the pressure-sensitive adhesive layer 3 as formed, the pressure-sensitive adhesive layer 3 preferably has a storage elastic modulus of 45,000 Pa or more. If the pressure-sensitive adhesive layer 3 has a storage elastic modulus of more than 80,000 Pa, undulations may fail to be reduced sufficiently.

The storage elastic modulus and the adhesive strength of the pressure-sensitive adhesive layer 3 can be controlled by the type and the Tg of the base polymer for the pressure-sensitive adhesive, by the type and the content of the crosslinking agent, or by other factors.

An example of the method for adjusting the storage elastic modulus of the pressure-sensitive adhesive layer 3 to 80,000 Pa or less includes using a monomer for forming the main skeleton of the base polymer in combination with another monomer copolymerizable with the monomer for forming the main skeleton so that the storage elastic modulus of the pressure-sensitive adhesive layer 3 can be lowered at 120° C. The mechanism of lowering the storage elastic modulus at 120° C. may be that when the pressure-sensitive adhesive layer is heated, the monomer residue copolymerizable with the main skeleton remains unreacted in the pressure-sensitive adhesive layer and has a radical, which acts to cleave the main chain of the base polymer. The use of this method makes it possible to adjust the 120° C. storage elastic modulus to 80,000 Pa or less by heating the pressure-sensitive adhesive layer 3 even when the pressure-sensitive adhesive layer 3 has a storage elastic modulus of more than 80,000 Pa at room temperature. Also when the pressure-sensitive adhesive layer 3 has a storage elastic modulus of 80,000 Pa or less at room temperature, the 120° C. storage elastic modulus can be adjusted to a desired value of 80,000 Pa or less by heating the pressure-sensitive adhesive layer 3.

The pressure-sensitive adhesive layer 3 can be used without particular limitation as long as it satisfies the above-described storage elastic modulus and adhesive strength. Specifically, for example, one having as a base polymer a polymer such as an acryl-based polymer, a silicone-base polymer, a polyester, a polyurethane, a polyamide, a polyvinyl ether, a vinyl acetate/vinyl chloride copolymer, a modified polyolefin, an epoxy-based polymer, a fluorine-based polymer, or a rubber-based polymer such as natural rubber or synthetic rubber can be appropriately selected and used. In particular, an acryl-based pressure-sensitive adhesive is preferably used in terms of being excellent in optical transparency, showing adhesive characteristics such as moderate wettability, cohesiveness and tackiness, and also being excellent in weather resistance and heat resistance.

As the acryl-based pressure-sensitive adhesive, a base polymer being an acryl-based polymer having a monomer unit of an alkyl(meth)acrylate as a main backbone, can be used. It is to be noted that the (meth)acrylate refers to an acrylate and/or a methacrylate, and has the same meaning as (meth) in the present invention.

The number of carbon atoms of the alkyl group of the alkyl(meth)acrylate, which forms the main backbone of the acryl-based polymer, is about 1 to 14, and specific examples of the alkyl(meth)acrylate may include methyl(meth)acrylate, ethyl(meth)acrylate, propyl(meth)acrylate, isopropyl(meth)acrylate, n-butyl(meth)acrylate, isobutyl(meth)acrylate, pentyl(meth)acrylate, hexyl(meth)acrylate, 2-ethylhexyl(meth)acrylate, octyl(meth)acrylate, isooctyl(meth)acrylate, nonyl(meth)acrylate, isononyl(meth)acrylate, decyl(meth)acrylate, dodecyl(meth)acrylate and stearyl(meth)acrylate. They may be used alone, or in combination thereof. Among them, alkyl(meth)acrylates with the alkyl group having 1 to 9 carbon atoms are preferable.

One or more of various kinds of monomers can be introduced into the acryl-based polymer by copolymerization for the purpose of improving tackiness and heat resistance. Specific examples of the copolymerization monomer described above include carboxyl group-containing monomers, hydroxyl group-containing monomers, nitrogen-containing monomers (including heterocycle-containing monomers) and aromatic substance-containing monomers.

Examples of the carboxyl group-containing monomer include acrylic acid, methacrylic acid, carboxyethyl(meth)acrylate, carboxypentyl(meth)acrylate, itaconic acid, maleic acid, fumaric acid and crotonic acid. Among them, acrylic acid and methacrylic acid are preferable.

Examples of the hydroxyl group-containing monomer include 2-hydroxyethyl(meth)acrylate, 2-hydroxypropyl(meth)acrylate, 4-hydroxybutyl(meth)acrylate, 6-hydroxyhexyl(meth)acrylate, 8-hydroxyoctyl(meth)acrylate, 10-hydroxydecyl(meth)acrylate, 12-hydroxylauryl(meth)acrylate and (4-hydroxymethylcyclohexyl)-methyl acrylate.

Examples of the nitrogen-containing monomer include maleimide, N-cyclohexyl maleimide, N-phenyl maleimide; N-acryloyl morpholine; (N-substituted) amine-based monomers such as (meth)acrylamide, N,N-dimethyl(meth)acrylamide, N,N-diethyl(meth)acrylamide, N-hexyl(meth)acrylamide, N-methyl(meth)acrylamide, N-butyl(meth)acrylamide, N-butyl(meth)acrylamide, N-methylol(meth)acrylamide and N-methylolpropane(meth)acrylamide; alkyl-aminoalkyl(meth)acrylate-based monomers such as aminoethyl(meth)acrylate, aminopropyl(meth)acrylate, N,N-dimethylaminoethyl(meth)acrylate, t-butylaminoethyl(meth)acrylate and 3-(3-pyridinyl)propyl(meth)acrylate; alkoxyalkyl(meth)acrylate-based monomers such as methoxyethyl(meth)acrylate and ethoxyethyl(meth)acrylate; and also succinimide-based monomers such as N-(meth)acryloyloxymethylenesuccinimide, N-(meth)acryloyl-6-oxyhexamethylenesuccinimide, N-(meth)acryloyl-8-oxyoctamethylenesuccinimide and N-acryloylmorpholine as examples of monomers intended for modification.

Examples of the aromatic substance-containing monomer include benzyl(meth)acrylate, phenyl(meth)acrylate and phenoxyethyl(meth)acrylate.

Examples of the monomer include, in addition to the above-mentioned monomers, acid anhydride group-containing monomers such as maleic anhydride and itaconic anhydride; caprolactone adducts of acrylic acid; sulfonic acid group-containing monomers such as styrene sulfonic acid, allyl sulfonic acid, 2-(meth)acrylamide-2-methylpropanesulfonic acid, (meth)acrylamidepropanesulfonic acid, sulfopropyl(meth)acrylate and (meth)acryloyloxynaphthalenesulfonic acid; and phosphoric acid group-containing monomers such as 2-hydroxyethylacryloyl phosphate.

Further, vinyl-based monomers such as vinyl acetate, vinyl propionate, N-vinylpyrrolidone, methylvinylpyrrolidone, vinylpyridine, vinylpiperidone, vinylpyrimidine, vinylpiperazine, vinylpyrazine, vinylpyrrole, vinylimidazole, vinyloxazole, vinylmorpholine, N-vinylcarboxylic acid amides, styrene, α-methylstyrene and N-vinylcaprolactam; cyanoacrylate-based monomers such as acrylonitrile and methacrylonitrile; epoxy group-containing acryl-based monomers such as glycidyl(meth)acrylate; glycol-based acryl ester monomers such as polyethylene glycol(meth)acrylate, polypropylene glycol(meth)acrylate, methoxyethylene glycol(meth)acrylate, methoxy polypropylene glycol(meth)acrylate; acrylic acid ester-based monomers such as tetrahydrofurfuryl(meth)acrylate, fluorine(meth)acrylate, silicone(meth)acrylate and 2-methoxyethyl acrylate; and the like can be used.

When an acryl-based pressure-sensitive adhesive is used to form the pressure-sensitive adhesive layer 3, a hydroxyl group-containing monomer is preferably used as a copolymerizable monomer in combination with an alkyl(meth)acrylate having an alkyl group of 1 to 9 carbon atoms, which is used as a monomer to form the main skeleton of the acryl-based polymer. For example, to lower the 120° C. storage elastic modulus of the pressure-sensitive adhesive layer, it is preferred that butyl(meth)acrylate should be used as the monomer for forming the main skeleton and 2-hydroxyethyl(meth)acrylate should be used as the hydroxyl group-containing monomer.

Among them, hydroxyl group-containing monomers are suitably used because they have good reactivity with a crosslinking agent. Carboxyl group-containing monomers such as acrylic acid are preferably used in terms of tackiness and bond durability.

The ratio of the aforementioned copolymerization monomer in the acryl-based polymer is not particularly limited, but is 50% by weight or less in terms of a weight ratio. The ratio is preferably 0.1 to 10% by weight, more preferably 0.5 to 8% by weight, further preferably 1 to 6% by weight.

The average molecular weight of the acryl-based polymer is not particularly limited, but its weight average molecular weight is preferably about 300,000 to 2,500,000. The acryl-based polymer can be produced by various kinds of publicly known methods, and for example, a radical polymerization method such as a bulk polymerization method, a solution polymerization method or suspension polymerization method can be appropriately selected. As a radical polymerization initiator, any one of those that are publicly known, such as azo-based and peroxide-based radical polymerization initiators, can be used. The reaction temperature is normally about 50 to 80° C., and the reaction time is 1 to 8 hours. Among the aforementioned production methods, the solution polymerization method is preferable, and ethyl acetate, toluene or the like is generally used as a solvent for the acryl-based polymer.

The crosslinking agent blended with the acryl-based polymer can improve adhesion with a transparent conductive film and durability, and can maintain reliability at a high temperature and the shape of the pressure-sensitive adhesive itself. As the crosslinking agent, an isocyanate-based, an epoxy-based, a peroxide-based, a metal chelate-based or an oxazoline-based crosslinking agent, etc. can be appropriately used. These crosslinking agents can be used alone, or in combination of two or more thereof.

For the isocyanate-based crosslinking agent, an isocyanate compound is used. Examples of the isocyanate compound include isocyanate monomers such as tolylene diisocyanate, chlorophenylene diisocyanate, hexamethylene diisocyanate, tetramethylene diisocyanate, isophorone diisocyanate, xylylene diisocyanate, diphenylmethane diisocyanate and hydrogenated diphenylmethane diisocyanate, and adduct-based isocyanate compounds obtained by adding the above-mentioned isocyanate monomers with trimethylolpropane or the like; isocyanurated products, burette type compounds, and urethane prepolymer type isocyanates obtained by subjecting a known polyether polyol, polyester polyol, acryl polyol, polybutadiene polyol, polyisoprene polyol or the like to an addition reaction.

The isocyanate-based crosslinking agents may be used alone, or used in mixture of two or more thereof, but for the overall content, the polyisocyanate compound crosslinking agent is contained preferably in an amount of 0.01 to 2 parts by weight, more preferably in an amount of 0.02 to 2 parts by weight, further preferably in an amount of 0.05 to 1.5 parts by weight, based on 100 parts by weight of the (meth)acryl-based polymer (A). The isocyanate-based crosslinking agent can be appropriately contained in consideration of cohesive strength and inhibition of peeling in a durability test.

As the peroxide-based crosslinking agent, various kinds of peroxides are used. Examples of the peroxide include di-(2-ethylhexyl)peroxydicarbonate, di(4-t-butylcyclohexyl)peroxydicarbonate, di-sec-butyl peroxydicarbonate, t-butyl peroxyneodecanoate, t-hexyl peroxypivalate, t-butyl peroxypivalate, dilauroyl peroxide, di-n-octanoyl peroxide, 1,1,3,3-tetramethylbutyl peroxyisobutyrate, 1,1,3,3-tetramethylbutylperoxy 2-ethylhexanoate, di-(4-methylbenzoyl) peroxide, dibenzoyl peroxide and t-butyl peroxyisobutyrate. Among them, particularly, di(4-t-butylcyclohexyl)peroxydicarbonate, dilauroyl peroxide and dibenzoyl peroxide, which are excellent in crosslinking reaction efficiency, are preferably used.

The peroxides may be used alone, or in mixture of two or more thereof, but for the overall content, the peroxide is contained in an amount of 0.01 to 2 parts by weight, preferably in an amount of 0.04 to 1.5 parts by weight, more preferably in an amount of 0.05 to 1 parts by weight, based on 100 parts by weight of the (meth)acryl-based polymer (A). The content is appropriately selected within this range for adjustment of processability, reworkability, crosslinking stability and the peeling property.

Further, the pressure-sensitive adhesive of the present invention may contain a silane coupling agent. By using the silane coupling agent, durability can be improved. As the silane coupling agent, a silane coupling agent having any appropriate functional group can be used. Specific examples of the functional group include a vinyl group, an epoxy group, an amino group, a mercapto group, a (meth)acryloxy, an acetoacetyl group, an isocyanate group, a styryl group, and a polysulfide group. Specific examples include vinyl group-containing silane coupling agents such as vinyltriethoxysilane, vinyltripropoxysilane, vinyltriisopropoxysilane and vinyltributoxysilane; epoxy group-containing silane coupling agents such as γ-glycidoxypropyltrimethoxysilane, γ-glycidoxypropyltriethoxysilane, 3-glycidoxypropylmethyldiethoxysilane and 2-(3,4-epoxycyclohexyl)ethyltrimethoxysilane; amino group-containing silane coupling agents such as γ-aminopropyltrimethoxysilane, N-β-(aminoethyl)-γ-aminopropylmethyldimethoxysilane, N-(2-aminoethyl)-3-aminopropylmethyldimethoxysilane, γ-triethoxysilyl-N-(1,3-dimethylbutylidene)propylamine and N-phenyl-γ-aminopropyltrimethoxysilane; mercapto group-containing silane coupling agents such as γ-mercaptopropylmethyldimethoxysilane; styryl group-containing silane coupling agents such as p-styryltrimethoxysilane; (meth)acryl group-containing silane coupling agents such as γ-acryloxypropyltrimethoxysilane and γ-methacryloxypropyltriethoxysilane; isocyanate group-containing silane coupling agents such as 3-isocyanatepropyltriethoxysilane; and polysulfide group-containing silane coupling agents such as bis(triethoxysilylpropyl)tetrasulfide.

The silane coupling agents may be used alone, or used in mixture of two or more thereof, but for the overall content, the silane coupling agent is contained preferably in an amount of 0.001 to 5 parts by weight, further preferably in an amount of 0.01 to 1 part by weight, still further preferably in an amount of 0.02 to 1 part by weight, still further preferably in an amount of 0.05 to 0.6 parts by weight based on 100 parts by weight of the acryl-based polymer.

For example, appropriate additives such as a filler formed of resins of a natural product or synthetic product, glass fibers, glass beads, a metal powder or other inorganic powders, a pigment, a colorant and an antioxidant can also be blended in the pressure-sensitive adhesive layer 3 as necessary. Also, transparent fine particles can be included to form the pressure-sensitive adhesive layer 3 provided with light diffusion characteristics.

As the transparent fine particles, one or more kinds of appropriate fine particles such as, for example, conductive inorganic fine particles of silica, calcium oxide, alumina, titania, zirconia, tin oxide, indium oxide, cadmium oxide, antimony oxide and the like, which have an average particle diameter of 0.5 to 20 μm, and crosslinked or uncrosslinked organic fine particles formed of an appropriate polymer such as polymethyl methacrylate or polyurethane can be used.

The aforementioned pressure-sensitive adhesive layer 3 is normally used as a pressure-sensitive adhesive solution having a solid concentration of about 10 to 50% by weight, which is obtained by dissolving or dispersing a base polymer or a composition thereof in a solvent. As the aforementioned solvent, solvent appropriate to the type of the pressure-sensitive adhesive, such as an organic solvent including toluene or ethyl acetate, or water can be appropriately selected and used.

Examples of the method of forming the pressure-sensitive adhesive layer 3 include, but are not limited to, a method of applying and drying a pressure-sensitive adhesive (solution) and a method of transferring a pressure-sensitive adhesive layer from a release film. Methods of application that may be used include roll coating such as reverse coating or gravure coating, spin coating, screen coating, fountain coating, dipping, and spraying.

The process of laminating the first coating layer 11 of the coating film 1 to one side of the transparent conductive film 2 where the transparent conductive layer 1 is absent may include providing the pressure-sensitive adhesive layer 3 on the transparent conductive film 2 and then laminating the first coating layer 11 of the coating film 1 to the pressure-sensitive adhesive layer 3 or otherwise may include providing the pressure-sensitive adhesive layer 3 on the first coating layer 11 of the coating film 1 and then laminating the transparent conductive film 2 to the pressure-sensitive adhesive layer 3.

The thickness of the pressure-sensitive adhesive layer, which may be appropriately determined depending on the intended use or the adhesive strength, is generally from 1 to 500 μm, preferably from 1 to 50 μm. The thickness of the pressure-sensitive adhesive layer is more preferably from 1 to 40 μm, even more preferably from 5 to 30 μm, still more preferably from 10 to 25 μm. If its thickness is less than 1

μm, its durability may be lower, and if it is thick, lifting or peeling may be more likely to occur due to foaming or the like, so that an appearance defect may be more likely to occur.

In addition, although not shown, an oligomer blocking layer may be provided on one side of the second transparent resin film 20 where the pressure-sensitive adhesive layer 3 is to be placed, and the pressure-sensitive adhesive layer 3 may be placed on the second transparent resin film 20 with the oligomer blocking layer interposed therebetween.

As the material for forming the oligomer prevention layer, any appropriate material capable of forming a transparent film is used, and the material may be an inorganic substance, an organic substance or a composite material thereof. The thickness of the oligomer prevention layer is preferably 0.01 to 20 μm. For formation of the oligomer prevention layer 5, a coating method using a coater, a spraying method, a spin coating method, an in-line coating method or the like is often used, but a method such as a vacuum deposition method, a sputtering method, an ion plating method, a spray thermal decomposition method, a chemical plating method or an electroplating method may be used. In the coating method, a resin component such as a polyvinyl alcohol resin, an acrylic resin, a urethane resin, a melamine resin, an UV curable resin or an epoxy resin, or a mixture of the above-mentioned resin with inorganic particles of alumina, silica, mica or the like may be used. Alternatively, the base component may be made to have a function as a prevention layer 5 by co-extrusion of a polymer substrate in two or more layers. In a method such as a vacuum deposition method, a sputtering method, an ion plating method, a spray thermal decomposition method, a chemical plating method or an electroplating method, a metal including gold, silver, platinum, palladium, copper, aluminum, nickel, chromium, titanium, iron, cobalt or tin, or an alloy thereof, or a metal oxide including indium oxide, tin oxide, titanium oxide, cadmium oxide or a mixture thereof, or other metal compounds including steel iodide or the like can be used.

In the patterning step, patterning can be performed by etching the transparent conductive layer 21. In etching, the transparent conductive layer 21 is covered with a mask for forming a pattern, and the transparent conductive layer 21 is etched with an etchant.

Since for the transparent conductive layer 21, indium oxide containing tin oxide or tin oxide containing antimony is suitably used, an acid is suitably used as an etchant. Examples of the acid include inorganic acids such as hydrogen chloride, hydrogen bromide, sulfuric acid, nitric acid and phosphoric acid, organic acids such as acetic acid, mixtures thereof, and aqueous solutions thereof.

When the undercoat layer 22 is composed of at least two layers, only the transparent conductive layer 21 can be etched to be patterned, or after etching the transparent conductive layer 21 with an acid to be patterned, at least the undercoat layer at the largest distance from the second transparent resin film 20 can be etched to be patterned like the transparent conductive layer 21. Preferably, the undercoat layer excluding the first undercoat layer from the second transparent resin film 20 can be etched to be patterned like the transparent conductive layer 21.

In etching of the undercoat layer 22, the undercoat layer 22 is covered with a mask for forming a pattern similar to that obtained by etching the transparent conductive layer 21, and the undercoat layer 22 is etched with an etchant. Since for the undercoat layer above the second layer, an inorganic substance such as $SiO_2$ is suitably used as described previously, an alkali is suitably used as an etchant. Examples of the alkali include aqueous solutions of sodium hydroxide, potassium hydroxide, ammonia, tetramethyl ammonium hydroxide and the like, and mixtures thereof. It is preferred that the first transparent conductive layer is formed of an organic substance that is not etched with an acid or an alkali.

Further, the transparent conductive laminate according to the present invention can be subjected to a step of heating at 60 to 200° C. to crystallize the transparent conductive layer 21. By heating in the crystallization step, the transparent conductive layer 21 is crystallized. Since the transparent conductive laminate according to the present invention has the pressure-sensitive adhesive layer 3 having the above-described predetermined storage elastic modulus and adhesive strength laminated thereon, undulation of the film can be kept small even when the film is treated by heating.

The heating temperature in crystallization is normally about 60 to 200° C., preferably 100 to 150° C. The heating time is 5 to 250 minutes. From such a viewpoint, it is preferred that the first and second transparent resin film 10, 20 have a heat resistance of 100° C. or higher, further preferably 150° C. or higher because the first and second transparent resin film 10, 20 is treated by heating as described above.

When the transparent conductive layer 21 is patterned by the patterning step, undulation of the film becomes large, so that deterioration of appearance due to level differences of the transparent conductive layer tends to be noticeable. Thus, it is preferred that the crystallization step is carried out after the transparent conductive laminate is subjected to the patterning step. In addition, since etching may become difficult when the transparent conductive layer 21 is crystallized, it is preferred that the crystallization step is carried out after the transparent conductive layer 21 is patterned by the patterning step. Further, when the undercoat layer 22 is etched, it is preferred that the crystallization step is carried out after etching of the undercoat layer 22.

The transparent conductive laminate according to the present invention can be used for an electrode substrate of an input device of a capacitive touch panel. For the capacitive touch panel, a multi-touch type can be employed, and the transparent conductive laminate according to the present invention can be used as a part of the electrode substrate.

EXAMPLES

The present invention will be described in detail below with reference to Examples, but the present invention is not limited to Examples below as long as the spirit of the present invention is maintained. In each Example, "part (s)" and "%" are both on the weight basis unless otherwise specified.

<Measurement of Weight Average Molecular Weight (Mw) by Gel Permeation Chromatography (GPC)>
Apparatus: Gel Permeation Chromatograph (HLC-8020) manufactured by TOSOH CORPORATION
Column: tandemly coupled TSKgel GMHXL, G4000HXL and G5000HXL manufactured by TOSOH CORPORATION
Eluent: tetrahydrofuran
Eluent flow rate: 1.0 ml/minute
Column temperature: 40° C.
Detection method: differential refractive index (RI)
Calibration curve: created by use of standard polystyrene
<Thickness of Each Layer>

For layers having a thickness of 1 μm or more, such as a film base, a transparent substrate, a hard coat layer and a pressure-sensitive adhesive layer, measurements were performed using a microgage-type thickness meter manufactured by Mitutoyo Corporation. In the case of layers for which it was difficult to measure the thickness directly, such as the hard coat layer and the pressure-sensitive adhesive layer, the thickness of each layer was calculated by measuring the total thickness of the base provided with each layer and subtracting therefrom the thickness of the base.

The thickness of each of a first undercoat layer, a second undercoat layer, an ITO film and the like was calculated on the basis of a waveform from an interference spectrum using MCPD 2000 (product name), an instantaneous multi photometric system, manufactured by Otsuka Electronics Co., Ltd.

<Surface Resistance of Undercoat Layer>

The surface electric resistance (Ω/□) of the undercoat layer was measured using a surface high resistance meter manufactured by Mitsubishi Chemical Corporation in accordance with a double ring method conforming to JIS K 6911 (1995).

<Preparation of Pressure-Sensitive Adhesive Solution (1)>

To a four-neck flask equipped with a condenser, a stirring blade, and a thermometer were added 95 parts of butyl acrylate, 4.9 parts of acrylic acid, 0.1 parts of 2-hydroxyethyl acrylate, and 0.1 parts of 2,2'-azobisisobutyronitrile together with 140 parts of ethyl acetate. After the air was sufficiently replaced by nitrogen gas, the mixture was allowed to react at 55° C. for 8 hours with stirring under a nitrogen gas stream, so that a solution of an acryl-based polymer with a weight average molecular weight of 2,400,000 was obtained. Based on 100 parts of the solid in the acryl-based polymer solution, 0.6 parts (solid basis) of a polyisocyanate crosslinking agent (CORONATE L manufactured by NIPPON POLYURETHANE INDUSTRY CO., LTD.) including a trimethylolpropane-tolylene diisocyanate adduct and 0.1 parts of a silane coupling agent (KBM403 manufactured by Shin-Etsu Chemical Co., Ltd.) were added to the polymer solution, so that a pressure-sensitive adhesive solution (1) was obtained.

<Preparation of Pressure-Sensitive Adhesive Solution (2)>

To a four-neck flask equipped with a condenser, a stirring blade, and a thermometer were added 50 parts of butyl acrylate, 48.7 parts of phenoxyethyl acrylate, 1 parts of acrylic acid, 0.3 parts of 2-hydroxyethyl acrylate, and 0.1 parts of 2,2'-azobisisobutyronitrile together with 140 parts of ethyl acetate. After the air was sufficiently replaced by nitrogen gas, the mixture was allowed to react at 55° C. for 8 hours with stirring under a nitrogen gas stream, so that a solution of an acryl-based polymer with a weight average molecular weight of 2,500,000 was obtained. Based on 100 parts of the solid in the acryl-based polymer solution, 0.6 parts (solid basis) of a polyisocyanate crosslinking agent (CORONATE L manufactured by NIPPON POLYURETHANE INDUSTRY CO., LTD.) including a trimethylolpropane-tolylene diisocyanate adduct and 0.1 parts of a silane coupling agent (KBM403 manufactured by Shin-Etsu Chemical Co., Ltd.) were added to the polymer solution, so that a pressure-sensitive adhesive solution (2) was obtained.

<Preparation of Pressure-Sensitive Adhesive Solution (3)>

To a four-neck flask equipped with a condenser, a stirring blade, and a thermometer were added 82.1 parts of butyl acrylate, 13 parts of benzyl acrylate, 4.8 parts of acrylic acid, 0.1 parts of 4-hydroxybutyl acrylate, and 0.1 parts of 2,2'-azobisisobutyronitrile together with 100 parts of ethyl acetate. After the air was sufficiently replaced by nitrogen gas, the mixture was allowed to react at 55° C. for 8 hours with stirring under a nitrogen gas stream, so that a solution of an acryl-based polymer with a weight average molecular weight of 2,200,000 was obtained. Based on 100 parts of the solid in the acryl-based polymer solution, 0.45 parts (solid basis) of a polyisocyanate crosslinking agent (CORONATE L manufactured by NIPPON POLYURETHANE INDUSTRY CO., LTD.) including a trimethylolpropane-tolylene diisocyanate adduct and 0.1 parts of dibenzoyl peroxide (product name "NYPER BMT" manufactured by NOF CORPORATION) were added to the polymer solution, so that a pressure-sensitive adhesive solution (3) was obtained.

<Formation of Coating Layer Using Forming Material (1)>

Prepared was a resin solution (product name: Lucifral NAB-007 manufactured by Nippon Paint Co., Ltd.) which contained 60% by weight in a solid content concentration of a resin component including a resin composition that forms the surface irregularities by phase separation and a photopolymerization initiator in a mixed solvent of methyl ethyl ketone and methyl isobutyl ketone. Acrylic fine particles (product name: BMSA-18GN manufactured by Sekisui Plastic Co., Ltd., average particle size 0.8 μm) were dispersed in methyl isobutyl ketone. The dispersion was mixed with the resin solution to prepare a coating composition (forming material (1)) having a solid content concentration of 40% by weight containing 0.1 part by weight of acrylic fine particles to 100 parts of the resin component.

The coating composition (forming material (1)) was applied to 125 μm thick polyethylene terephthalate film (in the following, referred to as a PET film) using a bar coater, and the coating film was dried by heating at 60° C. for 1 minute. After that, the resin composition was cured by irradiation with an ultraviolet ray of accumulative intensity of 300 mJ/cm$^2$ with a high pressure mercury lamp to form a 5 μm thick coating layer. The thickness of the coating layer was obtained from an average value of the thicknesses measured at 5 points that were equally spaced in the width direction of the film using a spectrometer (product name: MCPD2000 manufactured by Otsuka Electronics Co., Ltd.).

<Formation of Coating Layer Using Forming Material (2)>

A coating composition (forming material (2)) was prepared by adding 5 parts of hydroxycyclohexyl phenyl ketone (Irgacure 184 manufactured by Ciba Specialty Chemicals Inc.) as a photopolymerization initiator to 100 parts of an acrylic urethane resin (UNIDIC 17-806 manufactured by DIC Corporation) and diluting the mixture with toluene to a concentration of 30% by weight.

The coating composition (forming material (2)) was applied to a 125 μm thick PET film using a bar coater and dried at 100° C. for 3 minutes. Immediately after the drying, the coating composition was irradiated with ultraviolet light from two ozone-type, high-pressure, mercury lamps (80 W/cm$^2$ in energy density, 15 cm focused radiation) to form a 5 μm thick coating layer.

<Formation of Coating Layer Using Forming Material (3)>

Provided was a mixture (OPSTAR 27540 (trade name) manufactured by JSR Corporation, solids content: 56% by weight, solvent: butyl acetate/methyl ethyl ketone (MEK) =76/24 (volume ratio), refractive index: 1.49) for a coating layer-forming material. The mixture for a coating layer-forming material contains active energy ray-curable compounds and silica nanoparticles dispersed therein, in which the silica nanoparticles are composed of inorganic oxide particles and a polymerizable unsaturated group-containing organic compound bonded to the inorganic oxide particles. The coating layer-forming material contains dipentaerythritol and isophorone diisocyanate-based polyurethane as active energy ray-curable compounds, and silica fine particles (at most 100 nm in weight average particle size) whose surface is modified with an organic molecule, in which the weight ratio of the active energy ray-curable compounds to the particles is 2:3. Five parts by weight of a photopolymerization initiator (Irgacure 127 (trade name) manufactured by Ciba Specialty Chemicals Inc.) was added to the mixture for a coating layer-forming material based on 100 parts by weight of the active energy ray-curable compounds. The resulting mixture was diluted with methyl ethyl ketone to a solid concentration of 5% by weight, so that a coating composition (forming material (3)) was obtained.

the coating composition (forming material (3)) was applied to a 125 µm thick PET film using a comma coater, so that an applied layer was formed. The applied layer was then dried by heating at 145° C. for 1 minute. Subsequently, the applied layer was irradiated with ultraviolet light from a high-pressure mercury lamp at a total dose of 300 mJ/cm$^2$ to form a 300 nm thick coating layer.

<Formation of Coating Layer Using Forming Material (4)>

A coating composition (forming material (4)) was prepared by adding 1 part by weight of a leveling agent (GRANDIC PC-4100 (trade name) manufactured by DIC Corporation) to an ultraviolet-curable resin (GRANDIC PC-1070 (trade name) manufactured by DIC Corporation) including isocyanurate acrylate, pentaerythritol triacrylate, isophorone diisocyanate polyurethane, based on 100 parts by weight of the resin solid, and diluting the mixture with ethyl acetate to a solid concentration of 50% by weight.

The coating composition (forming material (4)) was applied to a 125 µm thick PET film using a die coater to form an applied layer. The applied layer was then dried by heating at 100° C. for 1 minute. Subsequently, the applied layer was irradiated with ultraviolet light from a high-pressure mercury lamp at a total dose of 300 mJ/cm$^2$ to form a 5 µm thick coating layer.

<Formation of Coating Layer Using Forming Material (5)>

A coating composition (forming material (5)) was prepared by diluting silica sol (COLCOAT P manufactured by COLCOAT CO., LTD.) with ethanol to a solid concentration of 2%.

The coating composition (forming material (5)) was applied to a 125 µm thick PET film by silica coating method and then dried and cured at 150° C. for 2 minutes to form a 50 nm thick coating layer.

Example 1

<Formation of Pressure-Sensitive Adhesive Layer (1)>

The pressure-sensitive adhesive solution (1) was applied to a release-treated polyester film (38 µm in thickness) separator by reverse roll coating so that a 20 µm thick pressure-sensitive adhesive layer could be formed after drying, and was heat-treated at 130° C. for 3 minutes, so that the solvent was evaporated and a pressure-sensitive adhesive layer (1) was obtained.

<Preparation of Coating Film>

According to the process of "formation of coating layer using forming material (1)" described above, first and second coating layers were formed on both sides of a 125 µm thick PET film as a first transparent resin film, so that a coating film was obtained.

<Preparation of Transparent Conductive Film>

A first undercoat layer having a thickness of 185 nm was formed on one surface of a film base formed of a polyethylene terephthalate film (hereinafter, also referred to as a PET film) having a thickness of 25 µm using a thermosetting resin including a melamine resin, an alkyd resin and an organic silane condensate at a weight ratio of 2:2:1 (optical refractive index n=1.54). Then, a silica sol (product name "COLCOAT P" manufactured by COLCOAT CO., Ltd) was diluted with ethanol so as to have a solid concentration of 2%, applied onto the first undercoat layer by a silica coating method, then dried at 150° C. for 2 minutes, and cured to form a second undercoat layer having a thickness of 33 nm (SiO$_2$ film, optical refractive index: 1.46). Surface resistances after formation of the first and second undercoat layers were both $1 \times 10^{12} \Omega/\square$ or more.

(Formation of Transparent Conductive Layer)

Next, an ITO film, as a transparent conductive layer, having a thickness of 22 nm (optical refractive index: 2.00) was formed on the second undercoat layer by a reactive sputtering method using a sintered body material composed of 97% by weight of indium oxide and 3% by weight of tin oxide in an atmosphere at 0.4 Pa including 98% of argon gas and 2% of oxygen gas, and a transparent conductive film was obtained.

<Preparation of Transparent Conductive Laminate>

The 20 µm thick pressure-sensitive adhesive layer (1) formed as described above was transferred onto one side of the coating film having the coating layers on both sides, and then the separator was peeled off. Subsequently, the transparent conductive film (its surface on the side where no transparent conductive layer was formed) is laminated to the pressure-sensitive adhesive layer (1) to form a transparent conductive laminate.

(Patterning by Etching of ITO Film)

A photoresist patterned in a stripe form was applied to the transparent conductive layer of the transparent conductive laminate, and dried and cured, and thereafter the film was immersed in 5% hydrochloric acid (aqueous hydrogen chloride solution) at 25° C. for 1 minute to etch the ITO film.

(Patterning ITO Film by Etching)

A photoresist was applied in a 2 mm wide stripe pattern to the transparent conductive layer of the transparent conductive laminate and dried and cured. The laminate was then immersed in 5% hydrochloric acid (an aqueous hydrogen chloride solution) at 25° C. for 1 minute so that the ITO film was etched.

(Patterning of Second Undercoat Layer by Etching)

After the ITO film was etched, the film, on which the photoresist was laminated, was subsequently immersed in a 2% aqueous sodium hydroxide solution at 45° C. for 3 minutes to etch the second undercoat layer, and thereafter the photoresist was removed.

(Crystallization of Transparent Conductive Layer)

After the second undercoat layer was etched, a heating treatment was carried out at 140° C. for 90 minutes to crystallize the ITO film.

Examples 2 to 5 and Comparative Examples 1 to 4

Transparent conductive laminates were each prepared and then subjected to patterning and crystallization as in Example 1, except that the type of the pressure-sensitive adhesive layer (pressure-sensitive adhesive solution), the type of the material used to form the coating layer, and the thickness of the coating layer were changed as shown in Table 1. The first and second coating layers for the coating film were formed according to the process of "formation of coating layer using forming material (1), (2), (3), (4), or (5)" described above.

Reference Example 1

A pressure-sensitive adhesive layer-attached transparent conductive film was prepared by transferring the 20 µm thick pressure-sensitive adhesive layer (1) formed in Example 1 onto one side of the transparent conductive film where no transparent conductive layer was formed.

<Evaluation>

The coating films and the transparent conductive laminates obtained in the examples and the comparative examples and the pressure-sensitive adhesive layer-attached transparent conductive film obtained in Reference Example 1 were evaluated as described below. Table 1 shows the results. Table 1 also shows the materials used to form the coating layer and the second coating layer, the thicknesses of these layers, and the thickness of the pressure-sensitive adhesive layer.

<<Surface Free Energy>>

The surface free energy (mN/m) was measured before and after the coating film obtained in each of Examples 1, 3, and 5 and Comparative Example 1 was heated at 150° C. for 1 hour. The surface free energy was determined as follows. The contact angles of water, diiodomethane, and 1-bromonaphthalene on the first coating layer of the coating film were measured using Fully Automatic Contact Angle Meter DM-700 manufactured by Kyowa Interface Science Co., Ltd., and the surface free energy of the first coating layer was calculated from the contact angles using analysis software FAMAS. Component analysis based on the Kitazaki-Hat theory was used in the calculation process. For the pressure-sensitive adhesive layer-attached transparent conductive film obtained in Reference Example 1, the surface free energy of the surface of the separator on the pressure-sensitive adhesive layer was measured after the same treatment was performed.

<<Surface Roughness>>

The arithmetic means roughness (Ra) and the root mean square roughness (Rq) of the surface of the first coating layer of the coating film obtained in each of Examples 1, 3, and 5 and Comparative Example 1 were measured using an atomic force microscope (AFM) (Nanscope IV (trade name) manufactured by Digital Instruments). For the pressure-sensitive adhesive layer-attached transparent conductive film obtained in Reference Example 1, the surface of the separator on the pressure-sensitive adhesive layer was measured for each of the surface roughness values.

<<Storage Elastic Modulus>>

For the pressure-sensitive adhesive layer formed on the separator, the storage elastic modulus was determined by the following method.

[Method for Measurement of Storage Elastic Modulus]

The storage elastic modulus was measured using a viscoelasticity spectrometer (product name: RSA-II) manufactured by Rheometric Co. Measurement conditions included a frequency of 1 Hz, a sample thickness of 2 mm, a contact bonding load of 100 g and a temperature elevation rate of 5° C./min, and a value obtained at 120° C. in a range of −50° C. to 200° C. was employed as a measurement value.

<<Adhesive Strength>>

The transparent conductive laminate obtained in each of the examples and the comparative examples was cut into a 25 mm wide, 100 mm long piece. According to JIS Z 0237, the cut piece was subjected to the 180° peel test at a peel rate of 300 mm/minute using Autograph manufactured by NMB-Minebea Co., Ltd. (model: TCM-IKNB), in which the adhesive strength (N/25 mm) between the pressure-sensitive adhesive layer and the first coating layer was measured. For the pressure-sensitive adhesive layer-attached transparent conductive film obtained in Reference Example 1, the adhesive strength was measured between the pressure-sensitive adhesive layer and the separator.

<<Visual Evaluation of Steps>>

Each sample was obtained by fixing the transparent conductive laminate obtained in each of the examples and the comparative examples onto a glass sheet with a tape in such a way that the surface where the transparent conductive layer (ITO film) was formed faced upward. For Reference Example 1, a sample was obtained by fixing the pressure-sensitive adhesive layer-attached transparent conductive film onto a glass sheet with its pressure-sensitive adhesive layer in such a way that the surface where the ITO film was formed faced upward. Each sample was observed using a non-contact surface profiler (WYKO manufactured by Veeco Instruments Inc.) with a 10× ocular and a 0.5× objective. In the measurement, the difference between the highest part where the ITO film was formed and the lowest part where was adjacent to the ITO film and where no ITO film was formed was measured at three sites, and the average of the measurements at the three sites was determined as an undulation (μm).

TABLE 1

| | Coating film | | | | | | | | Pressure-sensitive adhesive layer | | | |
|---|---|---|---|---|---|---|---|---|---|---|---|---|
| | Second coating layer | | First coating layer | | | | | | | | Adhesive strength (N/25 nm) to first coating layer | Evaluation |
| | | | | | Surface free energy | | Surface roughness | | | | | |
| | Forming material type | Thickness | Forming material type | Thickness | Before heating (mN/m) | After heating (mN/m) | Ra (nm) | Rq (nm) | Type | Storage elastic modulus (Pa) at 120° C. | | Undulation (μm) |
| Example 1 | Forming material (1) | 5 μm | Forming material (1) | 5 μm | 43 | 38 | 3.7 | 4.7 | Pressure-sensitive adhesive layer (1) | 71000 | 7 | 0.2 |
| Example 2 | Forming material (2) | 7 μm | Forming material (3) | 300 nm | — | — | — | — | Pressure-sensitive adhesive layer (1) | 71000 | 15 | 0.3 |
| Example 3 | Forming material (2) | 5 μm | Forming material (4) | 5 μm | 30 | 27 | 3.7 | 4.6 | Pressure-sensitive adhesive layer (1) | 71000 | 10 | 0.2 |

TABLE 1-continued

| | Second coating layer | | First coating layer | | | | | | Pressure-sensitive adhesive layer | | | Evaluation |
| | | | | | Surface free energy | | Surface roughness | | | | | |
| | Forming material type | Thickness | Forming material type | Thickness | Before heating (mN/m) | After heating (mN/m) | Ra (nm) | Rq (nm) | Type | Storage elastic modulus (Pa) at 120° C. | Adhesive strength (N/25 nm) to first coating layer | Undulation (μm) |
|---|---|---|---|---|---|---|---|---|---|---|---|---|
| Example 4 | Forming material (2) | 5 μm | Forming material (2) | 5 μm | — | — | — | — | Pressure-sensitive adhesive layer (2) | 50000 | 11 | 0.1 |
| Example 5 | Forming material (2) | 5 μm | Forming material (5) | 50 nm | 38 | 38 | 5.2 | 7.1 | Pressure-sensitive adhesive layer (1) | 71000 | 16 | 0.2 |
| Comparative Example 1 | Forming material (2) | 5 μm | Forming material (2) | 5 μm | 42 | 43 | 10.5 | 13.1 | Pressure-sensitive adhesive layer (1) | 71000 | 30 | 0.7 |
| Comparative Example 2 | Forming material (5) | 50 nm | Forming material (2) | 7 μm | — | — | — | — | Pressure-sensitive adhesive layer (1) | 71000 | 26 | 0.6 |
| Comparative Example 3 | Forming material (5) | 50 nm | Forming material (2) | 7 μm | — | — | — | — | Pressure-sensitive adhesive layer (3) | 85000 | 25 | 0.6 |
| Comparative Example 4 | Forming material (2) | 5 μm | Forming material (4) | 5 μm | — | — | — | — | Pressure-sensitive adhesive layer (3) | 85000 | 10 | 1.1 |
| Reference Example 1 | — | — | — | — | 22 | 22 | 40.7 | 71.1 | Pressure-sensitive adhesive layer (1) | 71000 | 0.2 | 0.6 |

DESCRIPTION OF REFERENCE SIGNS

1 Coating film
10 First transparent resin film
11 First coating layer
12 Second coating layer
2 Transparent conductive film
21 Transparent conductive layer
22 Undercoat layer
3 Pressure-sensitive adhesive layer
A Transparent conductive laminate
a Patterned part
b Non-patterned part

The invention claimed is:

1. A transparent conductive laminate, comprising:
a coating film comprising a first transparent resin film and a coating layer or layers provided on one or both sides of the first transparent resin film;
a transparent conductive film comprising a second transparent resin film and a transparent conductive layer provided on one side of the second transparent resin film; and
a pressure-sensitive adhesive layer interposed between the coating film and the transparent conductive film,
wherein the coating layer is in direct contact with a side of the pressure-sensitive adhesive layer on which the transparent conductive film is not present;
wherein the second transparent resin film is in direct contact with a side of the pressure-sensitive adhesive layer on which the coating film is not present; and
the pressure-sensitive adhesive layer has a storage elastic modulus of from 45,000 Pa to 80,000 Pa at 120° C., and
the adhesive strength between the pressure-sensitive adhesive layer and the coating layer is from 5 N/25 mm to 20 N/25 mm,
wherein the coating layer laminated to the pressure-sensitive adhesive layer has a surface free energy of 25 mN/m to 40 mN/m after the coating film is heat-treated at 150° C. for 1 hour,
wherein the coating layer laminated to the pressure-sensitive adhesive layer has a surface with an arithmetic mean roughness (Ra) of 10 nm or less, and
wherein the coating layer laminated to the pressure-sensitive adhesive layer has a surface with a root mean square roughness (Rq) of 12 nm or less.

2. The transparent conductive laminate according to claim 1, wherein the transparent conductive layer is patterned.

3. The transparent conductive laminate according to claim 1, wherein the transparent conductive layer is placed on the second transparent resin film with at least one undercoat layer interposed therebetween.

4. The transparent conductive laminate according to claim 1, which is for use in a touch panel.

5. The transparent conductive laminate according to claim 4, wherein the touch panel is a capacitance touch panel.

6. The transparent conductive laminate according to claim 1, wherein the first transparent resin film comprises a resin selected from the group consisting of polyester resin, an acetate resin, a polyether sulfone resin, a polycarbonate resin, a polyamide resin, a polyimide resin, a polyolefin resin, a (meth)acrylic resin, a polyvinyl chloride resin, a polyvinylidene chloride resin, a polystyrene resin, a polyvinyl alcohol resin, a polyarylate resin and a polyphenylene sulfide resin.

7. The transparent conductive laminate according to claim 1, wherein the coating layer or layers comprise a resin selected from the group consisting of curable resins, urethane resin, alkyd resin, acrylic resin, silicone resin, and acrylic urethane resins.

8. The transparent conductive laminate according to claim 7, wherein the curable resin is melamine resin.

9. The transparent conductive laminate according to claim 1, wherein the second transparent resin film comprises a resin selected from the group consisting of polyester resin, an acetate resin, a polyether sulfone resin, a polycarbonate resin, a polyamide resin, a polyimide resin, a polyolefin resin, a (meth)acrylic resin, a polyvinyl chloride resin, a polyvinylidene chloride resin, a polystyrene resin, a polyvinyl alcohol resin, a polyarylate resin and a polyphenylene sulfide resin.

10. The transparent conductive laminate according to claim 1, wherein the transparent conductive layer comprises a metal oxide of at least one metal selected from the group consisting of indium, tin, zinc, gallium, antimony, titanium, silicon, zirconium, magnesium, aluminum, gold, silver, copper, palladium and tungsten.

11. The transparent conductive laminate according to claim 1, wherein the pressure-sensitive adhesive layer comprises a base polymer selected from the group consisting of acryl-based polymer, a silicone-based polymer, a polyester, a polyurethane, a polyamide, a polyvinyl ether, a vinyl acetate/vinyl chloride copolymer, a modified polyolefin, an epoxy-based polymer, a fluorine-based polymer and natural rubber.

12. The transparent conductive laminate according to claim 1, wherein the adhesive strength between the pressure-sensitive adhesive layer and the coating layer is from 7 N/25 mm to 20 N/25 mm.

13. A touch panel comprising at least one piece of the transparent conductive laminate according to claim 1.

* * * * *